United States Patent
Paden et al.

(10) Patent No.: US 7,197,130 B2
(45) Date of Patent: Mar. 27, 2007

(54) DYNAMIC LOAD BALANCING BETWEEN MULTIPLE LOCATIONS WITH DIFFERENT TELEPHONY SYSTEM

(75) Inventors: Jonathan Paden, Austin, TX (US); Bobby Sams, Austin, TX (US); Jon Harris, Little Elm, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 78 days.

(21) Appl. No.: 10/958,632

(22) Filed: Oct. 5, 2004

(65) Prior Publication Data

US 2006/0072737 A1 Apr. 6, 2006

(51) Int. Cl.
*H04M 3/00* (2006.01)
(52) U.S. Cl. .............. 379/265.02; 379/220.1; 379/221.05; 370/237
(58) Field of Classification Search ........... 379/220.01, 379/221.05, 265.02; 370/237
See application file for complete search history.

(56) References Cited

U.S. PATENT DOCUMENTS

| | | | |
|---|---|---|---|
| 4,953,204 A | 8/1990 | Cuschleg, Jr. et al. | |
| 4,967,405 A | 10/1990 | Upp et al. | |
| 5,335,269 A | 8/1994 | Steinlicht | |
| 5,455,903 A | 10/1995 | Jolissaint et al. | |
| 5,497,373 A | 3/1996 | Hulen et al. | |
| 5,522,046 A | 5/1996 | McMillen et al. | |
| 5,530,744 A | 6/1996 | Charalambous et al. | |
| 5,555,299 A | 9/1996 | Maloney et al. | |
| 5,590,186 A | 12/1996 | Liao et al. | |
| 5,652,789 A | 7/1997 | Miner et al. | |
| 5,754,639 A | * | 5/1998 | Flockhart et al. ...... 379/266.05 |
| 5,754,978 A | 5/1998 | Perez-Mendez et al. | |
| 5,923,745 A | * | 7/1999 | Hurd ............ 379/265.02 |

(Continued)

FOREIGN PATENT DOCUMENTS

EP 0 424 015 A2 4/1991

(Continued)

OTHER PUBLICATIONS

Ogino, Tsukasa, et al., "Technologies for Internet Infrastructure: Eliminating the World Wide Wait," iNet Japan, Jul. 18-21, 2000, www.isoc.org/inet2000/cdproceedings/1g/index.

(Continued)

*Primary Examiner*—Fan Tsang
*Assistant Examiner*—Hemant S. Patel
(74) *Attorney, Agent, or Firm*—Toler Schaffer, LLP

(57) ABSTRACT

An allocation component allocates its received calls among a plurality of telephony systems including a first telephony system and a second telephony system. A first routing protocol (RP) component distributes those of the calls allocated to the first telephony system among a first plurality of call center sites. A second RP component distributes those of the calls allocated to the second telephony system among a second plurality of call center sites. A load-balancing Interactive Voice Response (IVR) system dynamically distributes its received calls between the plurality of telephony systems based on agent availability data associated with the first and second plurality of call center sites and the second plurality of call center sites. A primary IVR receives a plurality of calls and routes a first percentage thereof to the allocation component and a second percentage thereof to the load-balancing IVR system.

20 Claims, 2 Drawing Sheets

U.S. PATENT DOCUMENTS

| | | |
|---|---|---|
| 5,940,476 A | 8/1999 | Morganstein et al. |
| 5,946,388 A | 8/1999 | Walker et al. |
| 5,953,704 A | 9/1999 | McIlroy et al. |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,049,594 A | 4/2000 | Furman et al. |
| 6,118,866 A * | 9/2000 | Shtivelman ................ 379/309 |
| 6,119,101 A | 9/2000 | Peckover |
| 6,173,266 B1 | 1/2001 | Marx et al. |
| 6,173,289 B1 | 1/2001 | Sonderegger et al. |
| 6,173,399 B1 | 1/2001 | Gilbrech |
| 6,175,621 B1 | 1/2001 | Begeja |
| 6,259,786 B1 | 7/2001 | Gisby |
| 6,269,153 B1 | 7/2001 | Carpenter et al. |
| 6,317,439 B1 | 11/2001 | Cardona et al. |
| 6,333,980 B1 | 12/2001 | Hollatz et al. |
| 6,353,608 B1 | 3/2002 | Cullers et al. |
| 6,366,658 B1 | 4/2002 | Bjornberg et al. |
| 6,366,668 B1 * | 4/2002 | Borst et al. ............ 379/266.04 |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,414,966 B1 | 7/2002 | Kulkarni et al. |
| 6,418,424 B1 | 7/2002 | Hoffberg et al. |
| 6,442,247 B1 | 8/2002 | Garcia |
| 6,510,414 B1 | 1/2003 | Chaves |
| 6,519,562 B1 | 2/2003 | Phillips et al. |
| 6,529,871 B1 | 3/2003 | Kanevsky et al. |
| 6,553,112 B2 | 4/2003 | Ishikawa |
| 6,570,967 B2 | 5/2003 | Katz |
| 6,584,180 B2 | 6/2003 | Nemoto |
| 6,584,191 B1 * | 6/2003 | McPartlan et al. ...... 379/265.02 |
| 6,587,556 B1 | 7/2003 | Judkins et al. |
| 6,598,136 B1 | 7/2003 | Norrod et al. |
| 6,600,736 B1 | 7/2003 | Ball et al. |
| 6,603,854 B1 | 8/2003 | Judkins et al. |
| 6,614,781 B1 | 9/2003 | Elliott et al. |
| 6,631,186 B1 | 10/2003 | Adams et al. |
| 6,678,360 B1 | 1/2004 | Katz |
| 6,678,718 B1 | 1/2004 | Khouri et al. |
| 6,690,788 B1 | 2/2004 | Bauer et al. |
| 6,694,012 B1 | 2/2004 | Posthuma |
| 6,697,460 B2 | 2/2004 | Knott et al. |
| 6,700,972 B1 | 3/2004 | McHugh et al. |
| 6,704,404 B1 | 3/2004 | Burnett |
| 6,707,789 B1 | 3/2004 | Arslan et al. |
| 6,714,631 B1 | 3/2004 | Martin et al. |
| 6,721,416 B1 | 4/2004 | Farrell |
| 6,731,722 B2 | 5/2004 | Coffey |
| 6,738,473 B1 | 5/2004 | Burg et al. |
| 6,744,861 B1 | 6/2004 | Pershan et al. |
| 6,744,877 B1 * | 6/2004 | Edwards ................ 379/265.02 |
| 6,751,306 B2 | 6/2004 | Himmel et al. |
| 6,757,306 B1 | 6/2004 | Klish, II et al. |
| 6,766,320 B1 | 7/2004 | Wang et al. |
| 6,775,359 B1 | 8/2004 | Ron et al. |
| 6,778,643 B1 | 8/2004 | Bushey et al. |
| 6,792,096 B2 | 9/2004 | Martin et al. |
| 6,807,274 B2 | 10/2004 | Joseph et al. |
| 6,823,307 B1 | 11/2004 | Steinbiss et al. |
| 6,831,932 B1 | 12/2004 | Boyle et al. |
| 6,832,224 B2 | 12/2004 | Gilmour |
| 6,842,504 B2 | 1/2005 | Mills et al. |
| 6,847,711 B2 | 1/2005 | Knott et al. |
| 6,853,722 B2 | 2/2005 | Joseph et al. |
| 6,853,966 B2 | 2/2005 | Bushey et al. |
| 6,859,529 B2 | 2/2005 | Duncan et al. |
| 6,871,212 B2 | 3/2005 | Khouri et al. |
| 6,879,683 B1 | 4/2005 | Fain et al. |
| 6,885,734 B1 | 4/2005 | Eberle et al. |
| 6,891,932 B2 | 5/2005 | Bhargava et al. |
| 6,895,083 B1 | 5/2005 | Bers et al. |
| 6,901,366 B1 | 5/2005 | Kuhn et al. |
| 6,907,119 B2 | 6/2005 | Case et al. |
| 6,915,246 B2 | 7/2005 | Gusler et al. |
| 6,963,983 B2 | 11/2005 | Munson et al. |
| 7,006,605 B1 | 2/2006 | Morganstein et al. |
| 7,031,444 B2 | 4/2006 | Shen et al. |
| 7,035,388 B2 | 4/2006 | Kurosaki et al. |
| 2001/0011211 A1 | 8/2001 | Bushey et al. |
| 2001/0018672 A1 | 8/2001 | Petters et al. |
| 2001/0021948 A1 | 9/2001 | Khouri et al. |
| 2001/0032229 A1 | 10/2001 | Hulls et al. |
| 2001/0034662 A1 | 10/2001 | Morris |
| 2002/0046030 A1 | 4/2002 | Haritsa et al. |
| 2002/0057678 A1 | 5/2002 | Jiang et al. |
| 2002/0059164 A1 * | 5/2002 | Shtivelman ................ 707/1 |
| 2002/0059169 A1 | 5/2002 | Quarterman et al. |
| 2002/0067714 A1 | 6/2002 | Crain et al. |
| 2002/0087385 A1 | 7/2002 | Vincent |
| 2002/0114432 A1 | 8/2002 | Shaffer et al. |
| 2002/0133394 A1 | 9/2002 | Bushey et al. |
| 2002/0133413 A1 | 9/2002 | Chang et al. |
| 2002/0135618 A1 | 9/2002 | Maes et al. |
| 2002/0156699 A1 | 10/2002 | Gray et al. |
| 2002/0165732 A1 | 11/2002 | Ezzeddine et al. |
| 2002/0196277 A1 | 12/2002 | Bushey et al. |
| 2003/0026409 A1 | 2/2003 | Bushey et al. |
| 2003/0035381 A1 | 2/2003 | Chen et al. |
| 2003/0035516 A1 | 2/2003 | Guedalia |
| 2003/0069937 A1 | 4/2003 | Khouri et al. |
| 2003/0097428 A1 * | 5/2003 | Afkhami et al. ............ 709/220 |
| 2003/0103620 A1 | 6/2003 | Brown et al. |
| 2003/0114105 A1 | 6/2003 | Haller et al. |
| 2003/0130864 A1 | 7/2003 | Ho et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0156133 A1 | 8/2003 | Martin et al. |
| 2003/0165223 A1 | 9/2003 | Timmins et al. |
| 2003/0187732 A1 | 10/2003 | Seta |
| 2003/0187773 A1 | 10/2003 | Santos et al. |
| 2003/0194063 A1 | 10/2003 | Martin et al. |
| 2003/0195753 A1 | 10/2003 | Homuth et al. |
| 2003/0202640 A1 | 10/2003 | Knott et al. |
| 2003/0202643 A1 | 10/2003 | Joseph et al. |
| 2003/0202649 A1 | 10/2003 | Haug, Jr., et al. |
| 2003/0204435 A1 | 10/2003 | McQuilkin et al. |
| 2003/0235287 A1 | 12/2003 | Margolis et al. |
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |

| | | |
|---|---|---|
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015744 A1 | 1/2005 | Bushey et al. |
| 2005/0018825 A1 | 1/2005 | Ho et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novack et al. |
| 2005/0169441 A1 | 8/2005 | Yacoub et al. |
| 2005/0169453 A1 | 8/2005 | Knott et al. |
| 2005/0201547 A1 | 9/2005 | Burg et al. |
| 2005/0240411 A1 | 10/2005 | Yacoub et al. |
| 2006/0072737 A1 | 4/2006 | Paden et al. |
| 2006/0177040 A1 | 8/2006 | Mitra et al. |

FOREIGN PATENT DOCUMENTS

| | | |
|---|---|---|
| EP | 0 424 015 A3 | 4/1991 |
| EP | 0 424 015 B1 | 4/1991 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 11/086,794, filed Mar. 22, 2005.
U.S. Appl. No. 11/144,375, filed Jun. 3, 2005.
U.S. Appl. No. 11/200,870, filed Aug. 10, 2005.
U.S. Appl. No. 11/214,451, filed Aug. 29, 2005.
U.S. Appl. No. 11/267,593, filed Nov. 4, 2005.
U.S. Appl. No. 10/898,722, filed Jul. 23, 2004.
U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 10/975,023, filed Oct. 27, 2004.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.

* cited by examiner

DYNAMIC LOAD BALANCING BETWEEN MULTIPLE LOCATIONS WITH DIFFERENT TELEPHONY SYSTEM

FIELD OF THE DISCLOSURE

The present disclosure relates to systems for distributing calls to call centers.

BACKGROUND

Multiple vendors provide telephone system equipment for distributing calls to different call centers in different locations. Each vendor's telephony system typically uses one of the common standards for its equipment to manage traffic across the various call centers.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

In some cases, two or more different telephony systems (e.g. from two or more different vendors) may receive the same call types from a single Interactive Voice Response (IVR) or Voice Response Unit (VRU). The allocation of calls between the two or more different telephony systems needs to be varied due to staffing issues at the multiple call centers and the unpredictable nature of call traffic.

Embodiments of the present invention use a secondary Interactive Voice Response (IVR) application to facilitate dynamic load balancing between two or more call centers that use different systems to manage their own traffic. Traffic is balanced prior to committing a call to a particular vendor's traffic management component, such as an Intelligent Call Management (ICM) component or another vendor's component, to provide a pre-ICM load-balancing approach. The application corrects service level shifts and provides real-time alerts and statistics to one or more businesses associated with the call centers.

Figure 1:
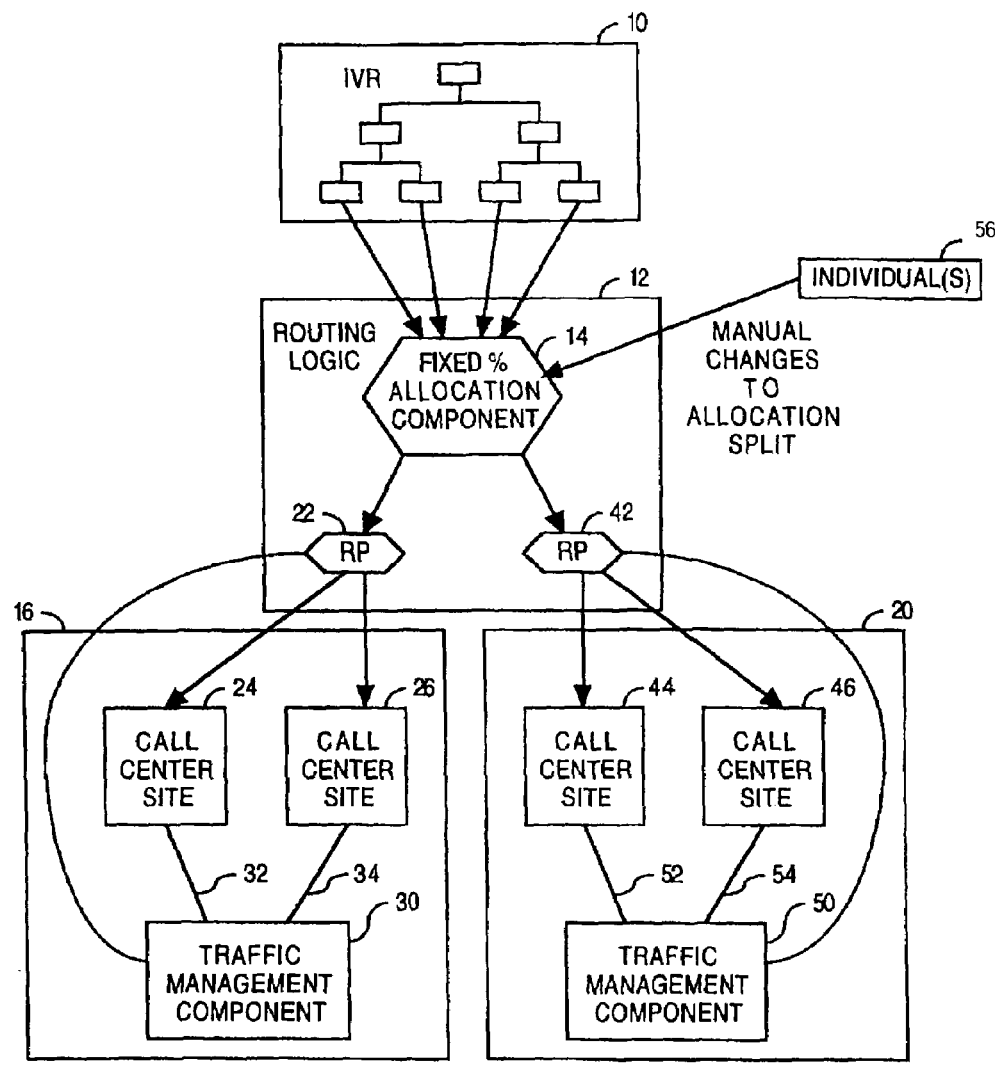
FIG. 1 is a schematic diagram of a first embodiment of a pre-ICM load balancing system.

FIG. 1 is a schematic diagram of a first embodiment of a pre-ICM load balancing system that is absent the aforementioned IVR application. This embodiment is described to contrast with FIG. 2, which shows a particular preferred embodiment that includes the secondary IVR application.

A primary IVR 10 receives calls that are processed by routing logic 12. The routing logic 12 includes an allocation component 14 to allocate a first percentage of the calls for a first telephony system 16 and a second percentage of the calls for a second telephony system 20. In the case of the two telephony systems 16 and 20, the sum of the first percentage and the second percentage is 100%. Those having ordinary skill will appreciate that the routing logic 12 may support more than two telephony systems in general.

The first telephony system 16 and the second telephony system 20 may be different types of telephony systems provided by different vendors. Examples of the different vendors include, but are not limited to, CISCO Systems, Inc. and GENESYS.

The routing logic 12 comprises a first routing protocol (RP) component 22 to route each of the calls allocated to the first telephony system 16 to a corresponding one of multiple call centers 24 and 26. The call centers 24 and 26 typically are disposed at different geographical locations. Agents at the call centers 24 and 26 receive the calls and service the calling parties. A first traffic management component 30 is in communication with the call centers 24 and 26 via peripheral gateway lines 32 and 34, respectively. The first traffic management component 30 determines call center information such as agent availability and service levels at the call centers 24 and 26. The first RP component 22 is responsive to the call center information from the first traffic management component 30 to vary how subsequent calls are to be allocated between the call centers 24 and 26

The routing logic 12 further comprises a second routing protocol (RP) component 42 to route each of the calls allocated to the second telephony system 20 to a corresponding one of multiple call centers 44 and 46. The call centers 44 and 46 typically are disposed at different geographical locations. Agents at the call centers 44 and 46 receive the calls and service the calling parties. A second traffic management component 50 is in communication with the call centers 44 and 46 via peripheral gateway lines 52 and 54, respectively. The second traffic management component 50 determines call center information such as agent availability and service levels at the call centers 44 and 46. The second RP component 42 is responsive to the call center information from the second traffic management component 50 to vary how subsequent calls are to be allocated between the call centers 44 and 46.

The allocation split between the first telephony system 16 and the second telephony system 20 produced by the allocation component 14 is manually changed by individual(s) 56 managing the system. The allocation of calls between the telephony systems 16 and 20 needs to be varied from initial percentages due to changes in staffing at the call centers 24, 26, 44 and 46 and the unpredictable nature of call traffic received by the primary IVR 10. The manual changes performed by the individual(s) 56 are reactive in nature and typically take minutes or hours of time to occur. Undesirable service levels and additional expenses may result using the manual approach.

Figure 2:
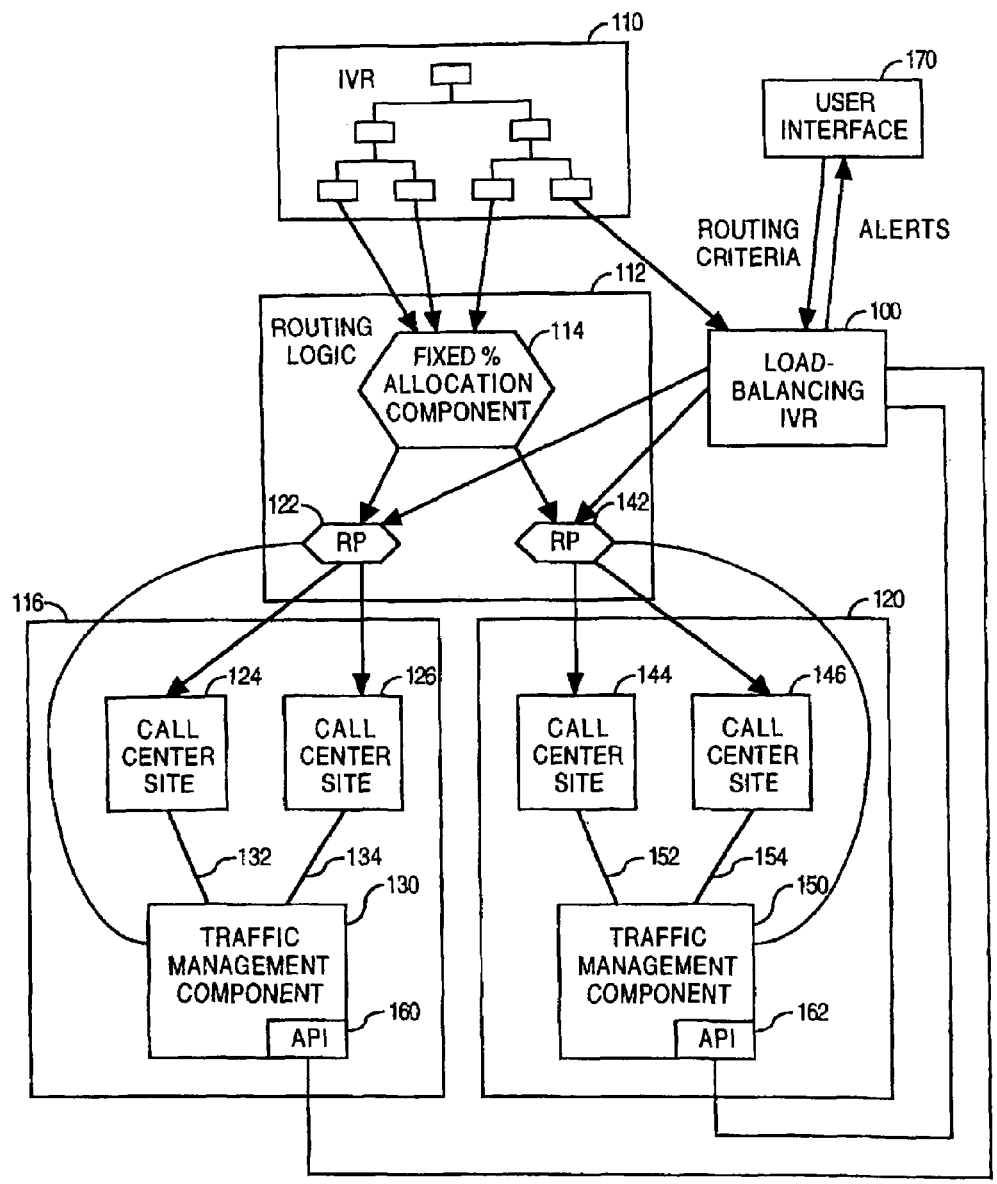
FIG. 2 is a schematic diagram of a second embodiment of a pre-ICM load balancing system which comprises a load-balancing IVR.

FIG. 2 is a schematic diagram of a second embodiment of a pre-ICM load balancing system that includes a load-balancing IVR system 100. A first percentage of calls received by a primary IVR 110 is routed to routing logic 112, and a second percentage of the calls received by the primary IVR 110 is routed to the load-balancing IVR 100. In general, the second percentage is about equal to or otherwise based on a maximum shift in allocation percentages between a first telephony system 116 and a second telephony system 120 which would occur if the manual approach in FIG. 1 was used. Thus, depending on the capacity and performance of call centers in the telephony systems 116 and 120, the first/second percentages may be 95%/5% or 90%/10% or 85%/20% or 80%/20%, for example. Preferably, the first percentage is greater than the second percentage so that most of the traffic is routed through the most inexpensive path possible while a small percentage of the traffic is routed through the load-balancing IVR 100 to dynamically balance telephony system loads. In practice, the load-balancing IVR 100 can initially receive 100% of the calls, and make a recommendation based on a sample of calls as to where to set the first/second percentage split. The recommendation can be outputted to a user via a user interface or an alert message such as an e-mail message.

The routing logic 112 includes an allocation component 114 to allocate a first percentage of its calls for the first telephony system 116 and a second percentage of its calls for the second telephony system 120. In the case of the two telephony systems 116 and 120, the sum of the first percentage and the second percentage is 100%. These percentages may be substantially fixed percentages. Those having ordinary skill will appreciate that the routing logic 112 may support more than two telephony systems in general.

The first telephony system 116 and the second telephony system 120 may be different types of telephony systems provided by different vendors. Examples of the different vendors include, but are not limited to, CISCO Systems, Inc. and GENESYS.

The load-balancing IVR 100 dynamically distributes its calls between the first and second telephony systems 116 and 120 based on agent availability data. A full description of the dynamic distribution follows a recitation of other components in the system.

The routing logic 112 comprises a first routing protocol (RP) component 122 to route each of the calls allocated to the first telephony system 116 to a corresponding one of multiple call centers 124 and 126. The call centers 124 and 126 typically are disposed at different geographical locations. Agents at the call centers 124 and 126 receive the calls and service the calling parties.

A first traffic management component 130 is in communication with the call centers 124 and 126 via peripheral gateway lines 132 and 134, respectively. The first traffic management component 130 determines call center information which includes first agent availability data for the call centers 124 and 126 of the first telephony system 116. The call center information may further comprise one or more Automatic Call Distribution (ACD) statistics such as a number of calls in queue, a service level, Average Holding Time (AHT), and/or Average Speed of Answer (ASA). The first RP component 122 is responsive to the call center information from the first traffic management component 130 to vary how subsequent calls are to be allocated between the call centers 124 and 126.

The routing logic 112 further comprises a second routing protocol (RP) component 142 to route each of the calls allocated to the second telephony system 116 to a corresponding one of multiple call centers 144 and 146. The call centers 144 and 146 typically are disposed at different geographical locations. Agents at the call centers 144 and 146 receive the calls and service the calling parties.

A second traffic management component 150 is in communication with the call centers 144 and 146 via peripheral gateway lines 152 and 154, respectively. The second traffic management component 150 determines call center information which includes second agent availability data for the call centers 144 and 146 of the second telephony system 120. The call center information may further comprise one or more ACD statistics such as a number of calls in queue, a service level, AHT, and/or ASA. The second RP component 142 is responsive to the call center information from the second traffic management component 150 to vary how subsequent calls are to be allocated between the call centers 144 and 146.

Each of the first and the second traffic management components 130 and 150 makes its call center information accessible to the load-balancing IVR 100. In one embodiment, the first traffic management component 130 comprises a Web-accessible application program interface (API) 160 to provide remote visibility of the first call center information, including first agent availability data, to the load-balancing IVR 100. Similarly, the second traffic management component 150 comprises a Web-accessible application program interface (API) 162 to provide remote visibility of the second call center information, including first agent availability data, to the load-balancing IVR 100.

In one embodiment, a call received by the primary IVR 110 and routed to the load-balancing IVR 100 is processed as follows. The load-balancing IvR 100 determines which of the telephony systems has a highest overall agent availability, and routes the received call to the telephony system having the highest overall agent availability.

To determine which telephony system the call is to be routed to, the load-balancing IVR 100 requests and receives the first call center information, including the first agent availability data, from the API 160 of the first traffic management component 130 and the second call center information, including the second agent availability data, from the API 162 of the second traffic management component 150. Additional first and second call center information that may be passed to the load-balancing IVR 100 includes the number of calls in queue, the service level, AHT, ASA, and/or other ACD statistics. The first and second call center information is communicated from the traffic management components 130 and 150 to the load-balancing IVR 100 over Web-based hook via a computer network using a communication protocol such as hypertext transfer protocol (HTTP). Although HTTP is preferred for purposes of portability and flexibility, alternatives such as dedicated frame relay or virtual private network (VPN) may be used.

Optionally, while determining which of the telephony systems has the highest overall agent availability, the load-balancing IVR 100 plays a message to the calling party within the call. The message may have a duration of about five to ten seconds, for example. The message may include a script advising the caller of an estimated hold time or his/her place in the queue based on the responses from the APIs 160 and 162.

Beneficially, the load-balancing IVR 100 can be remotely used by any other IVR over a standard voice path (e.g. a dedicated voice path or a plain old telephone service voice path). Thus, no data integration to other IVRs in the call centers 124, 126, 144 or 146 is required by the load-balancing IVR 100. In one embodiment, the load-balancing IVR 100 routes the call by performing a Dual Tone Multiple Frequency (DTMF) release transfer using a routing configuration of the telephony system having the highest overall agent availability. Any carrier's DTMF transfer function can be used, keeping inbound capacity requirements and call durations at or near a minimum.

In general, the scope of this disclosure is broadly inclusive of alternative criteria used by the load-balancing IVR 100 to determine which telephony system is to receive the call. Optionally, a graphical user interface 170 or another user interface receives user-specified routing criteria. The load-balancing IVR 100 processes its received calls based on the user-specified routing criteria. For example, the user-specified routing criteria may cause the load-balancing IVR 100 to favor a particular vendor's telephony system.

The load-balancing IVR 100 may be operative to generate an alert signal based on a trend or a surge defined by the agent availability data or other call center information received from the traffic management components 130 and 150. A particular business that offers the call centers to its customers may define its own alert conditions using the graphical user interface 170 or another user interface.

The acts performed by each of the herein-disclosed components can be directed by respective computer program code embodied in a computer-readable form on a computer-readable medium. Each of the herein-disclosed components may comprise a respective computer processor responsive to the computer program code to perform the acts.

It will be apparent to those skilled in the art that the disclosed embodiments may be modified in numerous ways and may assume many embodiments other than the particular forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   routing logic which comprises an allocation component to allocate its received calls among a plurality of telephony systems including a first telephony system and a second telephony system, the routing logic comprising a first routing protocol (RP) component to distribute those of the calls allocated to the first telephony system among a first plurality of call center sites of the first telephopy system, the routing logic further comprising a second RP component to distribute those of the calls allocated to the second telephony system among a second plurality of call center sites of the second telephony system;
   a load-balancing Interactive Voice Response (IVR) system which dynamically distributes its received calls between the plurality of telephony systems based on agent availability data associated with the first plurality of call center sites and the second plurality of call center sites; and
   a primary IVR system to receive a plurality of calls and to route a first percentage thereof to the routing logic and a second percentage thereof to the load-balancing IVR system.

2. The system of claim 1 wherein the load-balancing IVR system is responsive to a received call to determine which of the telephony systems has a highest overall agent availability, and to route the received call to the telephony system having the highest overall agent availability.

3. The system of claim 2 wherein the load-balancing IVR system is responsive to the received call to play a message to the received call while determining which of the telephony systems has the highest overall agent availability.

4. The system of claim 2 wherein the load-balancing IVR system is responsive to the received call to perform a DTMF release transfer using a routing configuration of the telephony system having the highest overall agent availability.

5. The system of claim 1 further comprising:
   a first traffic management component to determine first agent availability data for the first plurality of call center sites of the first telephony system, and to provide the first agent availability data to the load-balancing IVR system; and
   a second traffic management component to determine second agent availability data for the second plurality of call center sites of the second telephony system, and to provide the second agent availability data to the load-balancing IVR system.

6. The system of claim 5 wherein the first traffic management component comprises a first Web-accessible application program interface to provide remote visibility of the first agent availability data to the load-balancing IVR system, and wherein the second traffic management component comprises a second Web-accessible application program interface to provide remote visibility of the second agent availability data to the load-balancing IVR system.

7. The system of claim 1 wherein the second percentage is based on a maximum shift in allocation percentages between the first telephony system and the second telephony system.

8. The system of claim 1 wherein the first percentage is about 85% and the second percentage is about 15%.

9. The system of claim 1 wherein the load-balancing IVR system is to generate an alert signal based on a trend or a surge defined by the agent availability data.

10. The system of claim 1 further comprising a us a interface to receive user-specified routing criteria, wherein the load-balancing IVR system is to process its received calls based on the user-specified routing criteria.

11. A method comprising:
    distributing a first percentage of calls received by a primary Interactive Voice Response (IVR) system to a routing logic component and a second percentage of the calls to a load-balancing IVR system;
    allocating the calls received by the routing logic component among a plurality of telephony systems including a first telephony system and a second telephony system, the first telephony system having a first plurality of call center sites, the second telephony system having a second plurality of call center sites;
    dynamically distributing the calls received by the load-balancing IVR system between the plurality of telephony systems based on agent availability data associated with the first plurality of call center sites and the second plurality of call center sites;
    distributing those of the calls allocated to the first telephony system among a first plurality of call center sites of the first telephony system by a first routing protocol (RP) component; and
    distributing those of the calls allocated to the second telephony system among a second plurality of call center sites of the second telephony system by a second RP component.

12. The method of claim 11 wherein said dynamically distributing the calls received by the load-balancing IVR system comprises determining which of the telephony systems has a highest overall agent availability for a received call, and routing the received call to the telephony system having the highest overall agent availability.

13. The meted of claim 12 further comprising playing a message to a caller of the received call while determining which of the telephony systems has the highest overall agent availability.

14. The method of claim 12 wherein said dynamically distributing the calls received by the load-balancing IVR system comprises performing a DTMF release transfer using a routing configuration of the telephony system having the highest overall agent availability.

15. The method of claim 11 further comprising:
    determining first agent availability data for the first plurality of call center sites of the first telephony system and providing the first agent availability data to the load-balancing IVR system by a first traffic management component; and determining second agent availability data for the second plurality of call center sites of the second telephony system and providing the second agent availability data to the load-balancing IVR system by a second traffic management component.

16. The method of claim 15 wherein the first traffic management component comprises a first Web-accessible application program interface to provide remote visibility of the first agent availability data to the load-balancing IVR system, and wherein the second traffic management component comprises a second Web-accessible application program interface to provide remote visibility of the second agent availability data to the load-balancing IVR system.

17. The method of claim 11 wherein the second percentage is based on a maximum shift in allocation percentages between the first telephony system and the second telephony system.

18. The method of claim 11 wherein the first percentage is about 85% and the second percentage is about 15%.

19. The method of claim 11 further comprising generating an alert signal, by the load-balancing IVR system, based on a trend or a surge defined by the agent availability data.

20. The method of claim 11 further comprising receiving user-specified routing criteria via a user interface, wherein the load-balancing IVR system is to process its received calls based on the user-specified routing criteria.

* * * * *